(12) United States Patent
Raskar et al.

(10) Patent No.: US 7,965,936 B2
(45) Date of Patent: Jun. 21, 2011

(54) 4D LIGHT FIELD CAMERAS

(75) Inventors: Ramesh Raskar, Cambridge, MA (US); Amit K. Agrawal, Somerville, MA (US)

(73) Assignee: Mitsubishi Electric Research Laboratories, Inc, Cambridge, MA (US)

( * ) Notice: Subject to any disclaimer, the term of this patent is extended or adjusted under 35 U.S.C. 154(b) by 0 days.

(21) Appl. No.: 12/826,868

(22) Filed: Jun. 30, 2010

(65) Prior Publication Data

US 2010/0265386 A1 Oct. 21, 2010

Related U.S. Application Data

(62) Division of application No. 11/671,701, filed on Feb. 6, 2007, now Pat. No. 7,792,423.

(51) Int. Cl.
*G03B 13/00* (2006.01)

(52) U.S. Cl. ........................ 396/268; 396/89; 250/237 R

(58) Field of Classification Search ................... 396/268
See application file for complete search history.

(56) References Cited

U.S. PATENT DOCUMENTS

| | | | | |
|---|---|---|---|---|
| 6,097,394 A | * | 8/2000 | Levoy et al. | 345/419 |
| 2007/0252074 A1 | * | 11/2007 | Ng et al. | 250/208.1 |
| 2008/0266655 A1 | * | 10/2008 | Levoy et al. | 359/368 |

* cited by examiner

*Primary Examiner* — W. B. Perkey
*Assistant Examiner* — Dennis Hancock
(74) *Attorney, Agent, or Firm* — Dirk Brinkman; Gene Vinokur

(57) ABSTRACT

A camera acquires a 4D light field of a scene. The camera includes a lens and sensor. A mask is arranged in a straight optical path between the lens and the sensor. The mask including an attenuation pattern to spatially modulate the 4D light field acquired of the scene by the sensor. The pattern has a low spatial frequency when the mask is arranged near the lens, and a high spatial frequency when the mask is arranged near the sensor.

13 Claims, 15 Drawing Sheets

1200

4D LIGHT FIELD CAMERAS

RELATED APPLICATION

This Divisional Application claims priority to U.S. application Ser. No. 11/671,701, "4D Light Fields," filed by Raskar et al. on Feb. 6, 2007 now U.S. Pat. No. 7,792,423, incorporated herein.

FIELD OF THE INVENTION

This invention relates generally to image processing and computational photography, and more particularly to acquiring a 4D light filed of a scene with a camera.

BACKGROUND OF THE INVENTION

A trend in image processing and computational photography is to obtain additional optical information at the time images are acquired. This enables greater post-acquisition image processing applications, such as deblurring, refocusing, and novel images.

The key idea is to acquire the entire 4D light field entering the camera via the lens, and incident on the camera sensor. The light field is a function that describes the amount of light traveling in every direction through every point in space, Gershun, "The Light Field," Translated by Moon et al., Journal of Mathematics and Physics, Vol. XVIII, MIT, 1939, pp. 51-151, 1939. In a conventional camera, the sensed 2D image is only a 2D projection of the 4D light field. Therefore, it is not possible to reconstruct the entire 4D light field. Therefore, the way that conventional images can be changed in a meaningful way is severely limited.

Using a complex arrangement of optical elements, e.g., multiple lenses, mirrors, beam splitters and/or sensors, it is possible to re-bin the 4D rays and acquire them using a 2D sensor, Georgiev et al., "Spatio-angular resolution trade-offs in integral photography," EGSR, pp. 263-272, 2006. There a lens array with multiple optical paths performs the optical implementation of the two plane parameterization of the light field, see Levoy et al., "Light field rendering," SIGGRAPH 96, pp. 31-42, 1996, and Gortler et al., "The lumigraph," SIGGRAPH, pp. 43-54, 1996. However, optical rebining of rays forces a fixed and permanent tradeoff between spatial and angular resolution via the array of lenses.

Light Field Acquisition: Integral photography

Instead of measuring each incoming direction separately to estimate the entire 4D light field function, light field acquisition was first described about a century ago to "undo" the directional integration of all rays arriving at one point on a 4D film or sensor plane. A survey of the first integral cameras and its variants is described by Okano et al., "Three dimensional video system based on integral photography. Optical Engineering 38, pp. 1072-1077, 1999.

The concept of the 4D light field as a representation of all rays of light in free-space was described by Levoy et al., and Gortler et al. While both created images from virtual viewpoints, Levoy et al., also described computing images through a virtual aperture. However, a practical method for computing such images was not demonstrated until after a thorough study of 4D interpolation and filtering by Isaksen et al., "Dynamically reparameterized light fields," SIGGRAPH, pp. 297-306, 2000. Similar methods have also been called synthetic aperture photography, Vaish et al., "Using plane+parallax for calibrating dense camera arrays," Proc. Conf. Computer Vision and Pattern Recognition, pp. 2-9, 2004.

To acquire the 4D light field by a 2D sensor, the following two techniques are most often used. The first technique uses an array of lenses to acquire the light field of the scene from a grid of viewpoints. The image formed behind each lens provides an orderly grid of angular samples to provide a result similar to integral photography. Instead of fixed lens arrays, an optically equivalent configuration of individual cameras can also be used. There, an array of positive lenses is placed in front of a conventional camera with the aid of a prism.

The second technique places a single large lens in front of an array of micro-lenses and treating each micro-lens for spatial samples. Those plenoptic cameras form an image on the array of micro-lenses, each of which generates an image that samples an angular distribution of radiance at that point. This technique interchanges the placement of spatial and angular samples on the image plane.

Both of the above techniques trade spatial resolution for the ability to resolve angular differences. They require very precise alignment of micro-lenses and optical path with respect to the sensor. Obviously, those techniques are not suited for a simple conventional (digital) cameras, with just a lens, aperture and sensor.

Coded Imaging

In astronomy, coded aperture imaging is used to overcome the limitations of a pinhole camera, Skinner, "X-Ray Imaging with Coded Masks," Scientific American 259 p. 84, August 1988. Modified Uniformly Redundant Arrays (MURA) have been used to code the light distribution of distant stars. However, aperture imaging precludes the use of lenses as are used in conventional cameras.

A coded exposure camera can preserve high spatial frequencies in a motion-blurred image and make the deblurring process well-posed, see Raskar et al., "Coded exposure photography: motion deblurring using fluttered shutter," ACM Trans. Graph. 25, 3, pp. 795-804, 2006, and U.S. patent application Ser. No. 11/430,233, "Method and Apparatus for Deblurring Images" filed by Raskar on May 8, 2006, both incorporated herein by reference. That technique uses temporal modulation to minimize motion blur in images.

Prior art optical systems involving lenses and coded masks are rather limited. One system places a mask with four pin holes in front of the main lens and estimate depth from defocus by capturing four images, Hiura et al., "Depth measurement by the multi-focus camera," CVPR '98: Proceedings of the IEEE Computer Society Conference on Computer Vision and Pattern Recognition, IEEE Computer Society, Washington, D.C., USA, p. 953, 1998. However, it is desired to only use a single image for light field acquisition.

Wavefront coding is another technique to achieve extended depth of field (DOF) that use aspheric lenses to produce images with a depth-independent blur, Dowski et al., "Wavefront coding: A modern method of achieving high performance and/or low cost imaging systems," SPIE Annual Meeting, 1999. While their results extend depth of field in images, their design cannot provide a light field.

SUMMARY OF THE INVENTION

The embodiments of the invention provide a method and apparatus for acquiring and reconstructing a 4D light field of a scene. The light field is acquired of the scene by a 2D digital sensor of a camera while a patterned planar mask is arranged in an optical path between the lens and the sensor of the camera. The transmissive mask spatially modulates the 4D light field before it is sensed. The 4D light field can be reconstructed from the 2D sensor image.

Prior art light field cameras require multiple lenses, (and/or) multiple sensors, (and/or) multiple images, or multiple optical paths.

The mask can have a high frequency pattern or a broadband pattern. The patterned mask partially attenuates light rays inside the camera instead of bending them as is done in the prior art light field cameras. The attenuation reconstructably modulates and encodes the 4D light field onto the 2D sensor as a 2D input image. The camera can be focused just as a conventional camera used to acquire conventional 2D images at a full sensor resolution. That is, the camera can acquire 'still' shots, or videos.

With the camera according to the embodiments of the invention, pixel intensities can also resolve the modulated 4D light field. The light field can be reconstructed by rearranging tiles of a 2D Fourier transform of sensor pixel values into 4D planes, and determining an inverse Fourier transform to demodulate the 4D light field.

When a broadband mask is arranged near the lens, e.g., in the aperture, the method can refocus at full sensor resolution for images of layered Lambertian scenes. This partial modulating and encoding of the 4D light field enables editing of image contents by depth to remove, or suppress unwanted occluders.

The embodiments of the invention use hybrid imaging/light field camera designs that are easily adjustable. Users can simply change a single attenuating mask rather than arrays of lenses.

The invention exploits the fact that light rays can be linearly combined. Rather than sensing each 4D ray on its own pixel sensor, our design enables sensing linearly independent weighted sums of rays. The rays can then be combined in an encoded image. The encoded image can then be decoded or demodulated to reconstruct the rays of the 4D light field. These operations are done in Fourier domain rather than in ray space.

A mapping from 4D ray space to a 2D sensor array can also exploit heterodyning methods that are best described in the frequency domain. By exploiting the modulation and convolution theorems in the frequency domain, a simple attenuating mask can be determined. The mask can be placed in the optical path of the camera to achieve Fourier domain remapping. No additional lenses are necessary, and the decoded rays can be computed as needed by software.

DETAILED DESCRIPTION OF THE PREFERRED EMBODIMENTS

Light Field Cameras

Figure 1:
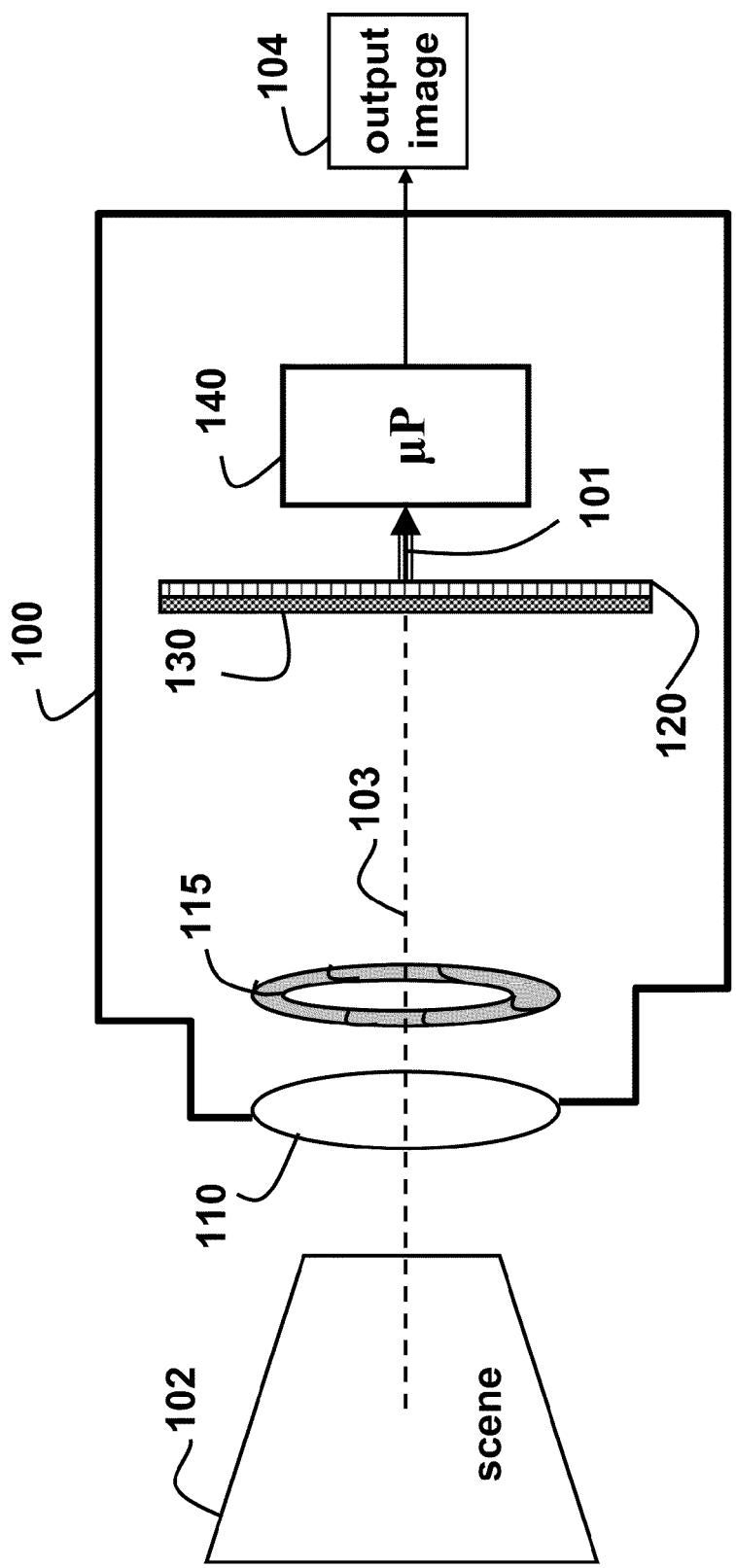
FIG. 1 is a side view schematic of a camera configured to acquire a 4D light field of a scene according to one embodiment of the invention.
Figure 2:
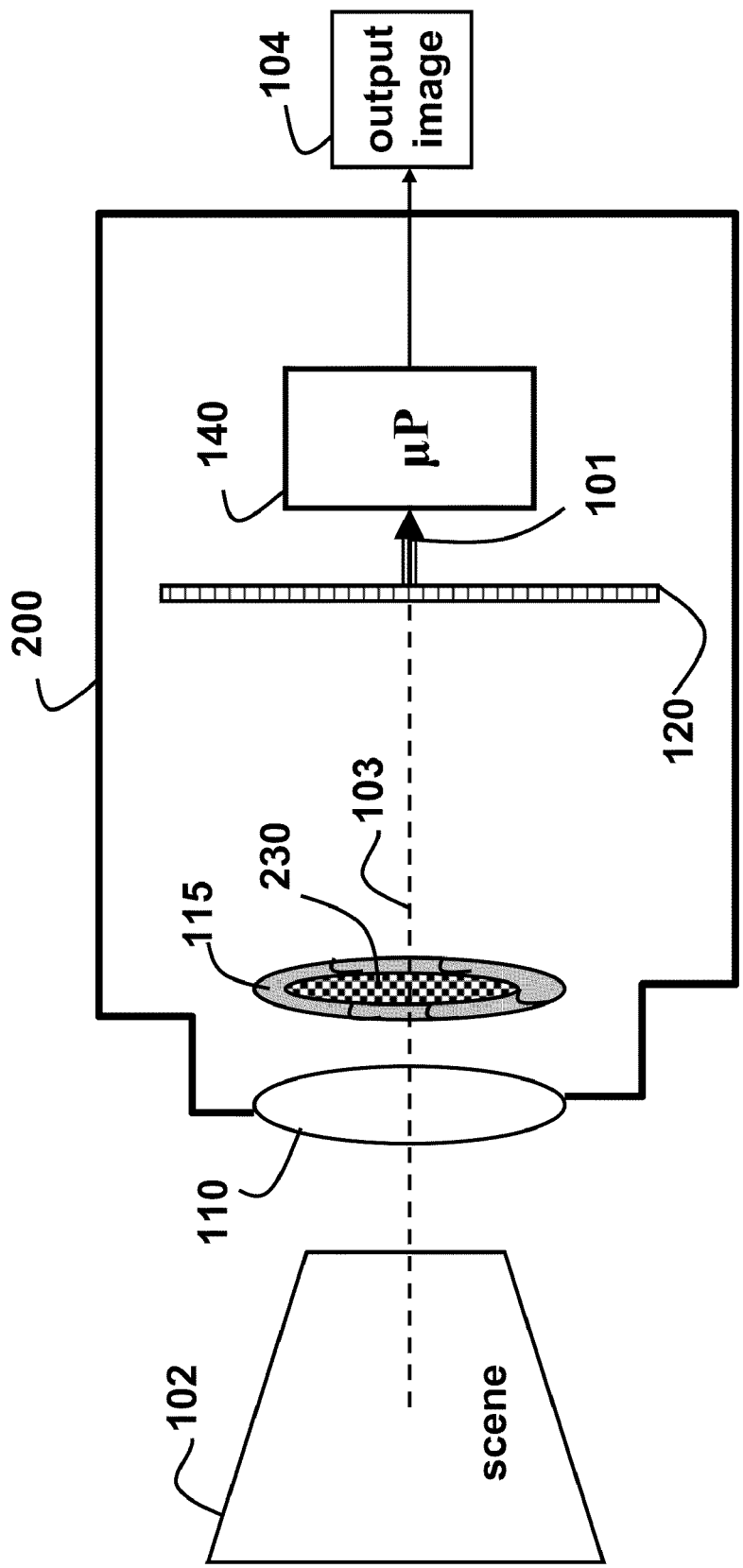
FIG. 2 is a side view schematic of a camera configured to acquire a 4D light field of a scene according to another embodiment of the invention.

As shown in FIGS. 1 and 2, the embodiments of our invention provide cameras 100 and 200 for acquiring and reconstructing a 4D light field 101 of a scene 102. The camera 100 includes a conventional lens 110, a conventional aperture 115 and a conventional sensor 120. The lens can include multiple elements, as in a compound lens, to correct for aberrations, coma, and distortion. However, it should be understood that there is only one optical path 103. The sensor can be a CCD line-scanner.

The cameras also include a microprocessor (μP) 140 that can be used to implement the methods described herein. Basically, the microprocessor receives a 2D input image 101, which encodes the 4D light field, and can generate an output image 104, which is a reconstruction of the light field. The output image 104 is a demodulation of the input image.

Because the input image encodes the light field, the output image can be refocused at a different or greater depth of field, as if a smaller aperture, or pinhole hole aperture was used. The output image 104 can also be deblurred, or be a novel image, see FIGS. 13 and 14.

The cameras also include a patterned mask 130 arranged in a straight optical path between the lens and sensor. The pattern partially attenuates the light field. The pattern can be spatially low frequency or spatially high frequency, or in between. Effectively, the pattern spatially modulates the 4D light field acquired of the scene 102 by the sensor 120: The pattern can also be an analytical 2D function, a binary function, or a continuous 2D function. It should also be understood that multiple masks can be arranged in the optical path.

Figure 11A:
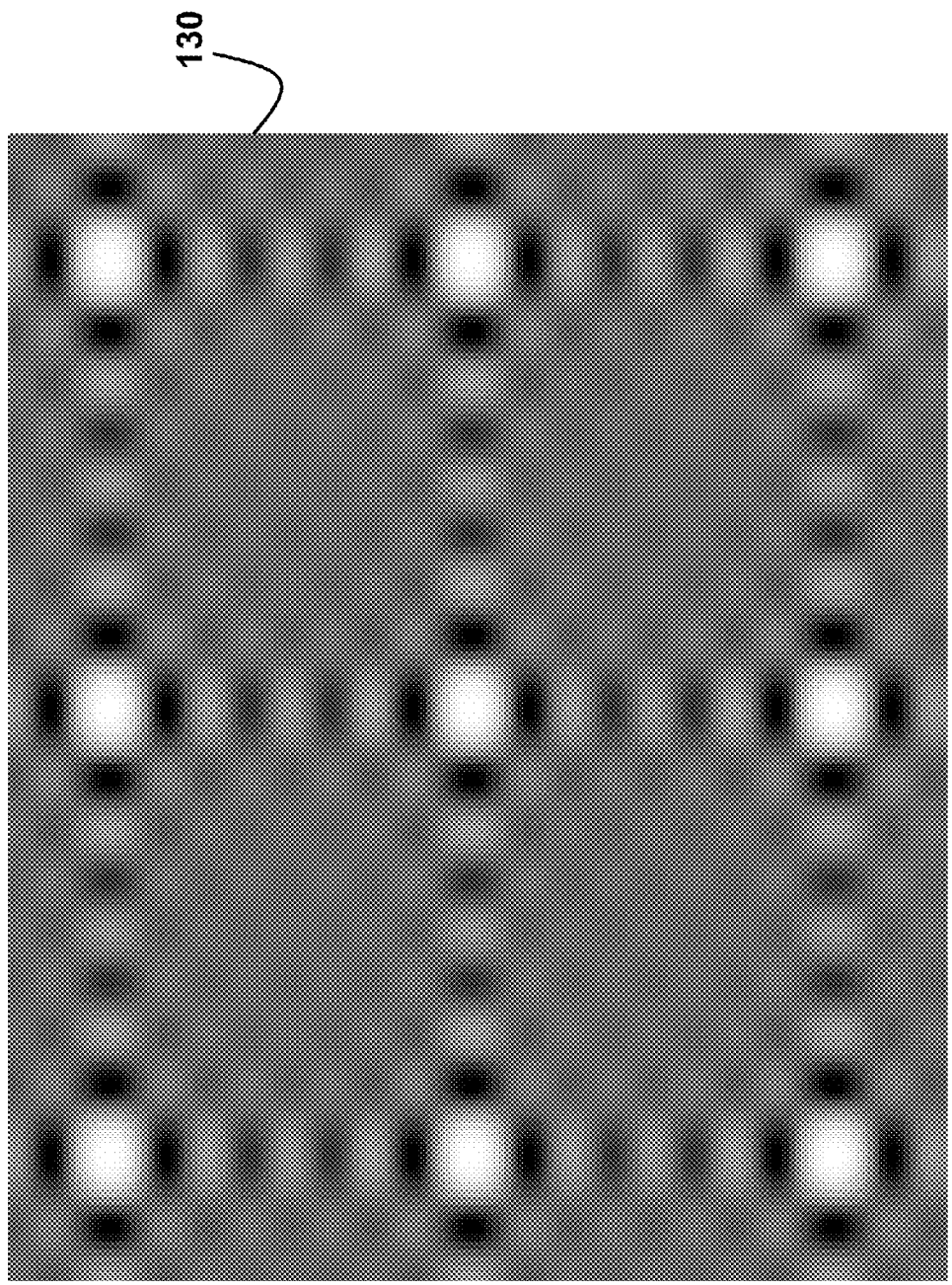
FIG. 11A is a diagram of high frequency mask according to embodiments of the invention.

In the camera 100, the spatially continuous high frequency 2D mask 130, see FIG. 11A, is arranged in the optical path 103 from the lens to the sensor. As shown for the camera 100 in FIG. 1, the mask 130 is arranged on or near a front surface of the sensor 120 to produce a heterodyne light field 101. The camera in FIG. 2 has a spatially continuous low frequency mask 230, see FIG. 11C, arranged near the lens or in the aperture 115. The cameras, except for the masks and methods operating in the microprocessor, are otherwise conventional.

After, the attenuated 4D light has been detected by the sensor 120, the basic objective of the invention has been achieved. The sensor, i.e., the sensor elements or pixels, now store a modulated 2D "image" of the 4D light field, which is sufficient to reconstruct the incident 4D light field.

The embodiments of the invention, also describe methods for encoding and manipulating portions of the acquired 4D light field. We describe a class of 4D light field cameras that re-map the Fourier transform of 4D ray space onto 2D sensors.

In contrast, prior art 4D cameras used 2D lens arrays to project 4D ray-space itself, rather than the Fourier transform of the ray space.

We achieve this frequency domain remapping using a single transmissive mask, and our method does not require additional optical elements such as lens arrays as in the prior art. In other words, the straight single optical path in our camera is entirely conventional.

Our analysis leads to two camera designs. FIG. 1 shows a heterodyne light field camera 100. This design is based on the modulation theorem in the 4D frequency domain, see Fessenden, "Wireless telephony," Trans. American Institute of Electrical Engineers 27, pp. 553-629, 1908, incorporated herein by reference.

We acquire the light field using an optical 4D optical version of a method known as 'heterodyning' in radio signaling. Heterodyning generates new frequencies by mixing two or more signals in a non-linear manner. The mixing of the two frequencies results in a first frequency that is the sum of the two frequencies, and a second frequency that is the difference. Heterodyning in our cameras is produced by the transmissive mask 130. We generate spectral tiles of the light field in the 4D frequency domain by forming a high-frequency sinusoidal pattern on the mask 130, see FIG. 11A, arranged in the optical path between lens and the sensor of the camera.

Figure 5:
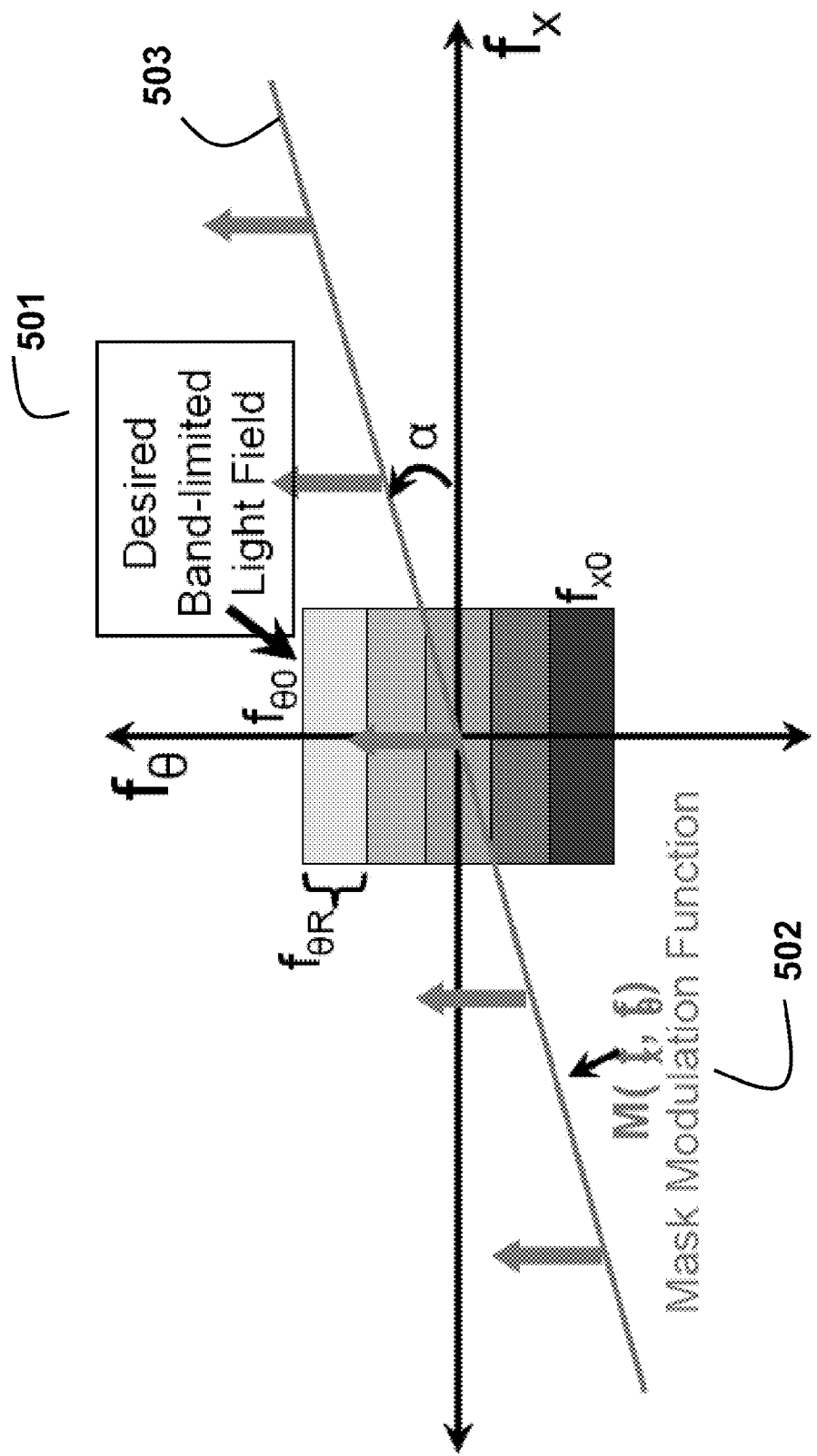
FIG. 5 is a schematic of spectral slicing in a heterodyne light field camera.
Figure 6:
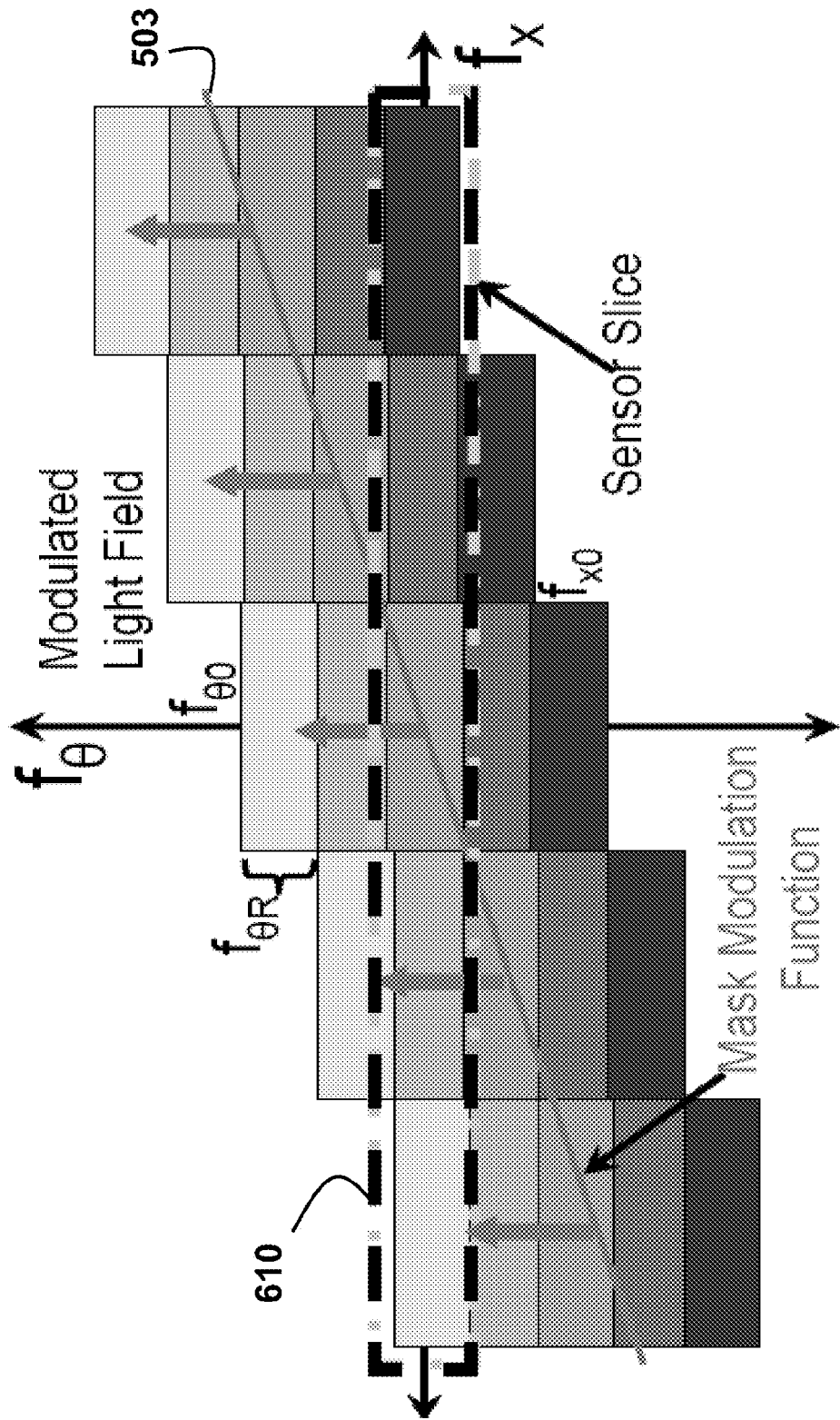
FIG. 6 is a schematic of a light field and a mask spectrum convolved to form spectral replicas according to an embodiment of the invention.
Figure 7:
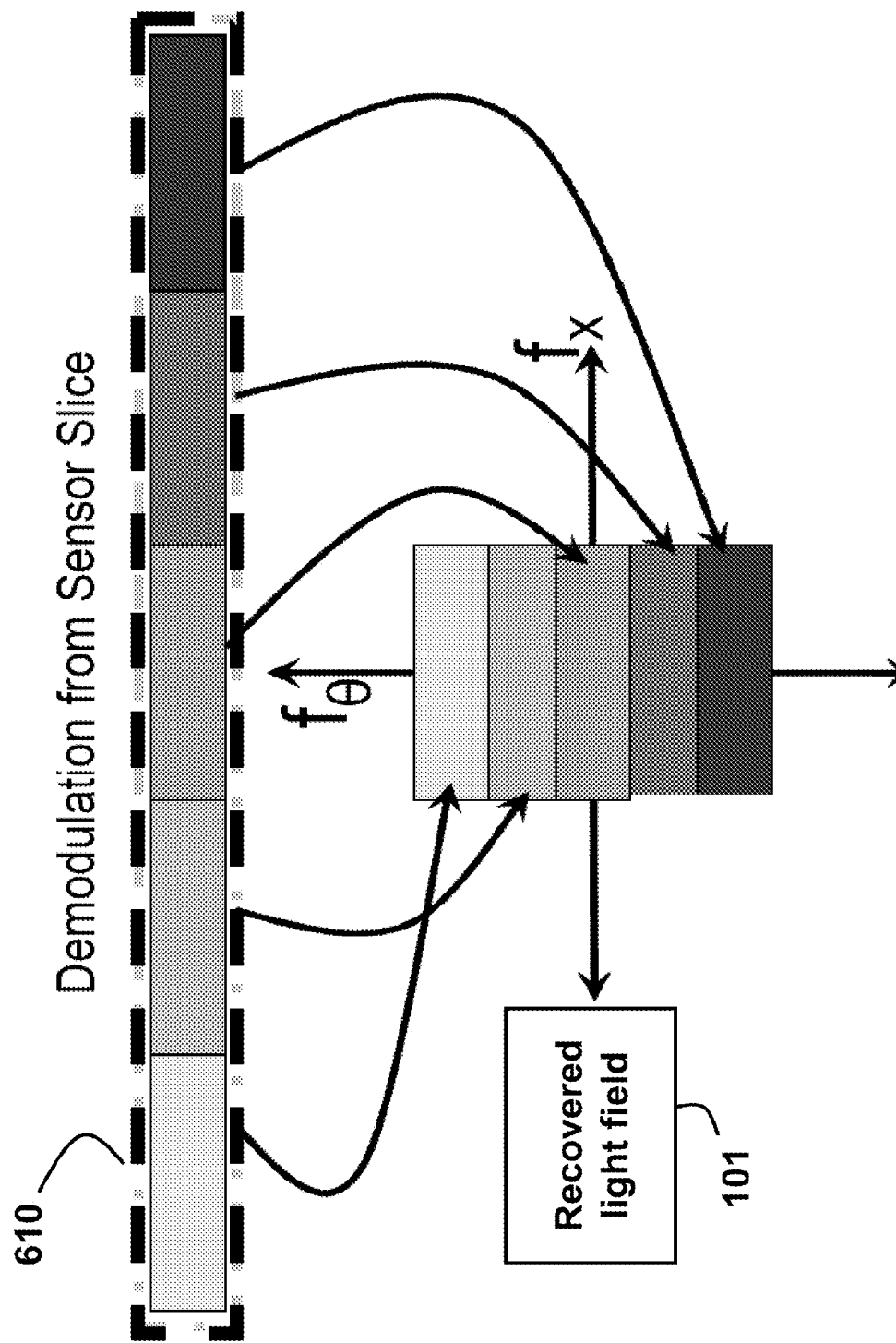
FIG. 7 is a schematic of demodulating sensor slices to reconstruct a light field according to an embodiment of the invention.

To reconstruct the 4D light field, see FIGS. 5-7, we compute the Fourier transform of the 2D signal sensed by the sensor, re-assemble the 2D tiles into a 4D stack of planes, and apply an inverse Fourier transform to the stack of tiles.

Unlike prior art 4D light field cameras, which rely on lens arrays, our hybrid imaging/light field camera does not force resolution tradeoffs for in-focus parts of the scene 102. The masks do not bend rays as they travel along the straight optical path from the scene to the sensor. The masks only attenuate the light rays in a shadow-like pattern. The attenuation provides for a spatial modulation of the light field. If we compensate for this shadowing, then we retain a full-resolution 2D image of the scene. In addition, we can reconstruct the 4D light field by Fourier-domain decoding or demodulation.

The camera 200 shown in FIG. 2 is based on the convolution theorem in the frequency domain, Oppenheim et al., "Discrete-Time Signal Processing," Prentice-Hall, 1999, incorporated herein by reference. By placing a low frequency mask 230 near or in the lens aperture 115 of an otherwise conventional 2D camera, we encode the defocus blur to preserve high spatial frequencies. The high spatial frequencies can subsequently be reconstructed by image deblurring techniques, see FIGS. 13 and 14.

We describe how to computationally refocus the full-resolution image at different depths for layered Lambertian scenes. This computed re-focussing is a special case of 4D remapping in the frequency domain that does not require measurement of the entire 4D light field. This avoids resolution penalties.

For both camera designs, we describe optimality design criteria of the masks 130 and 230 and describe a method for generating highly efficient masks.

Light Field

Figure 3:
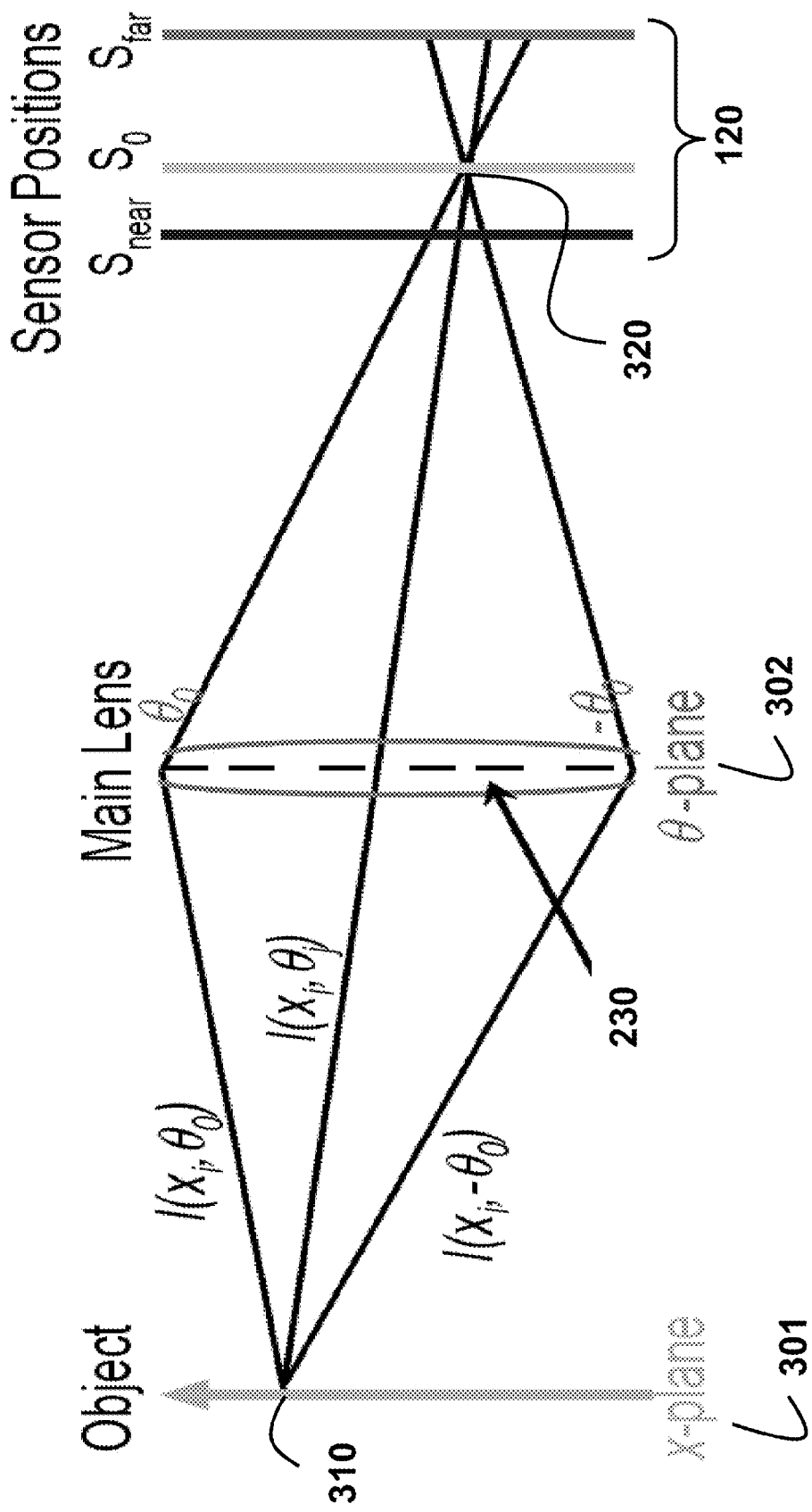
FIG. 3 is a schematic of the optical path of the cameras of FIGS. 1 and 2.
Figure 8:
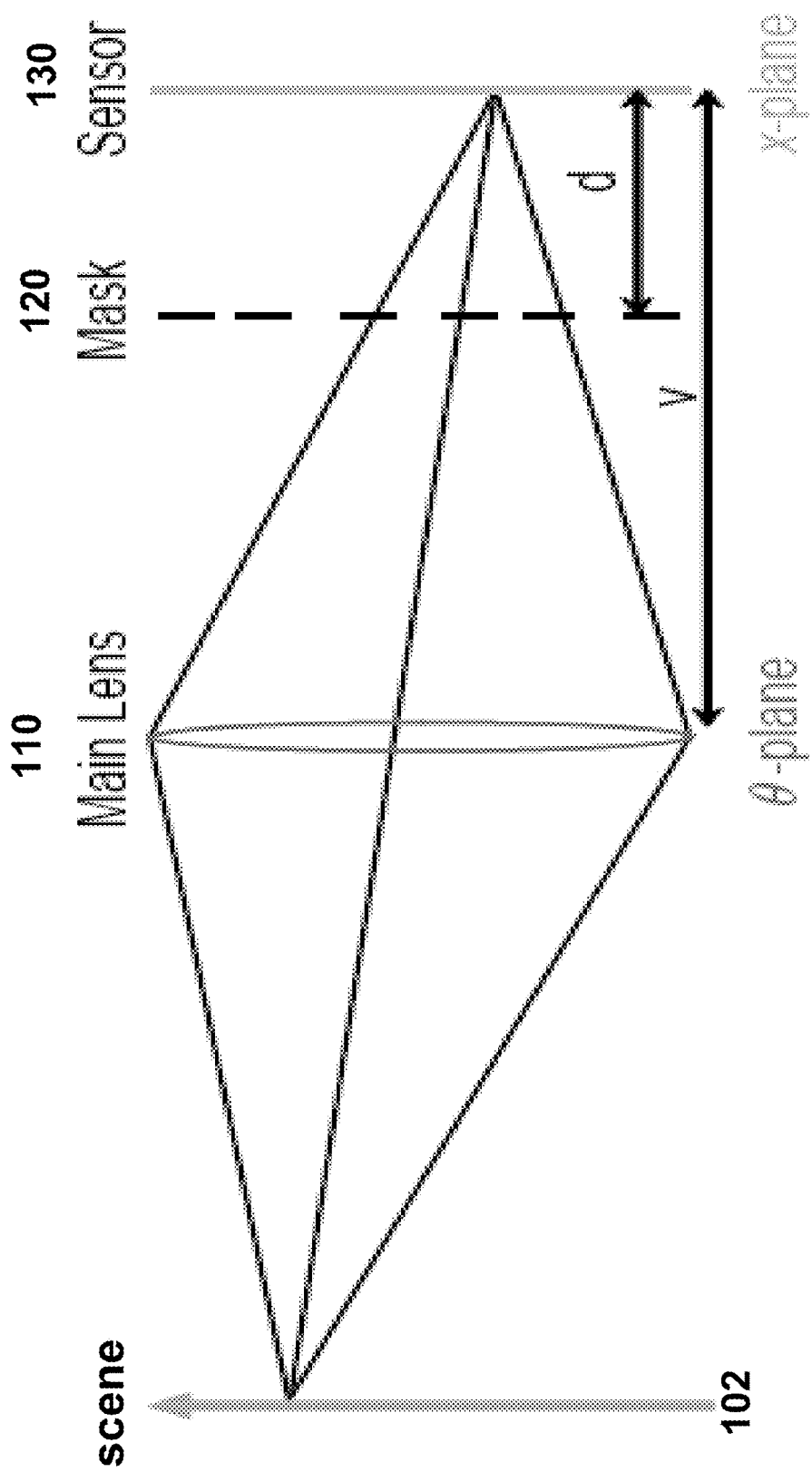
FIG. 8 is a schematic of a placement of a mask relative to a camera sensor.

FIGS. 3 and 8 show the basic operation of the embodiments of our invention. FIG. 3 shows the optics of the encoded blur camera 200.

FIG. 8 shows the optics of the heterodyne light field camera 100.

In ray-space, focused scene rays (l) of the 4D light field from a scene point 310 converge through the lens and mask to a point (pixel) 320 on the sensor 120. Out-of-focus rays imprint the mask pattern on the sensor image.

Figure 4:
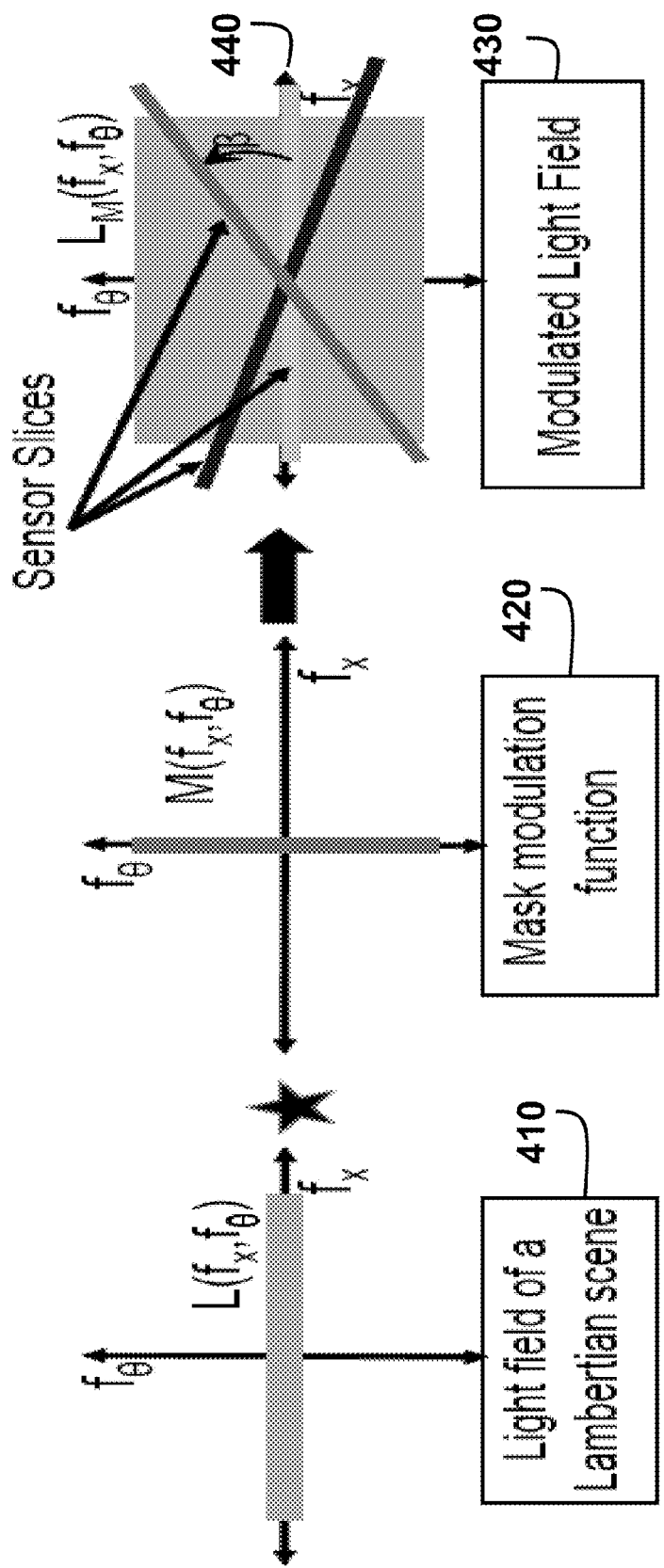
FIG. 4 is a schematic of a light field, a mask modulation function and a modulated light field according to an embodiment of the invention.

In the Fourier domain as shown in FIG. 4, the light fields 410 in a Lambertian scene lacks variation in an angular dimension θ, and form a horizontal spectrum. The mask placed at the aperture lacks variation in the x plane, and forms a vertical spectrum. The spectrum of the modulated light field 430, due to the mask modulation function 420, is a convolution of two spectrums. A focused sensor measures a horizontal spectral slice that tilts when out-of-focus.

We consider a 2D light field space (LS), with one spatial dimension in the x-plane 301, and one angular dimension in the θ-plane 302, and a 1D sensor 120, which optically, can be considered to move according to focus to positions $S_{near}$, $S_0$ (in-focus), and $S_{far}$. We denote variables by lower case letters, and their corresponding Fourier domain representations by upper case letters. Let l(x, θ) denote the 2D light field parametrized by the twin plane parameterization as shown in FIG. 3. The θ-plane 302 is selected to be the plane of the main lens, or the aperture for a cameras with a compound lens. For the case of planar Lambertian scene, we assume that the x-plane 301 coincides with the scene plane.

Effects of Optical Elements on the Light Field

We now discuss the effect of various optical elements such as sensor, lens and aperture to the 2D light field in frequency domain, which we refer as Fourier domain light field space (FLS). The (x, θ) space is referred to as the primal domain.

Sensor: The image formed on a 1D (2D) sensor is a 1D (2D) projection of the 2D (4D) light field entering the camera, which also corresponds to a slice 440 of the light field in Fourier domain, see FIG. 4. For different focus settings, see FIG. 3, the obtained image corresponds to slices at different angles/trajectories.

Lens: A thin lens shifts the x-plane of the light field to the conjugate plane given by the thin-lens equation: $1/x+1/v=1/f$, where x is the distance from the scene to the center of the lens, v is the distance from the center of the lens to the sensors, and f is the focal length of the lens. The lens also inverts the x-plane of the light field.

Aperture: The aperture of a camera acts as a light limiter, allowing only the light rays that pass through the aperture to enter the camera. The light field 1 after passing through the aperture is given by $$l_a(x,\theta)=l(x,\theta)\alpha(x,\theta), \quad (1)$$

where α(x, θ) is the aperture (rectangular) modulation function given by $\alpha(x, \theta)=\text{rect}(\theta/2\theta_0)$, and $2\theta_0$ is the size of the aperture.

From equation (1), the Fourier transform of the light field after the aperture is given by $$L_A(f_x,f_\theta)=L(f_x,f_\theta)\otimes A(f_x,f_\theta), \quad (2)$$

where ⊗ denotes convolution. L and A are the Fourier transforms of the light field (before the aperture) and the aperture modulation function, respectively. Because (x, θ) is a rect function, $$A(f_x,f_\theta)=2\alpha_0\,\text{sinc}(2\alpha_0 f_\theta). \quad (3)$$

FLS and Information Content in the Light Field

The light field is a 4D representation of the light rays in the free space. A 2D sensor can only sample one 2D slice of this light field. Depending on the scene, the information content in the light field is concentrated in different parts of the light field.

Planar Lambertian Scene

Let us assume that the scene being imaged includes of a planar Lambertian scene 410 at the x plane 301. Because there are no angular variations in the irradiance of rays from a Lambertian scene, the information content of its light field 410 is restricted to be along the $f_x$ axis. Thus, $L('f_x, f_\theta)=0$, for all $f_\theta$ not equal to zero. Because $L(f_x, f_\theta)$ is independent of $f_\theta$, and $A(fx, f_\theta)$ is independent of $f_x$, from equations (2) and (3) we obtain, $$L_A(f_x, f_\theta) = L(f_x, f_\theta) \otimes A(f_x, f_\theta) \quad (4)$$

$$= L(f_x, 0)A(0, f_\theta) \quad (5)$$

$$= 2a_0 L(f_x, 0)\text{sinc}(2a_0 f_\theta). \quad (6)$$

The sensed image is a slice 440 of this modulated light field 430, see FIG. 4.

When the sensor is in focus, ($S_0$) in FIG. 3, all rays from a scene point converge to a sensor pixel. Thus, the in-focus image corresponds to a slice of $L_A(f_x, f_\theta)$ along $f_x$; ($f_\theta=0$). Let y(s) and $Y(f_s)$ denotes the sensor observation and its Fourier transform, respectively. For an in-focus sensor $$Y(f_s) = L_A(f_s, 0) = 2a_0 L(f_s, 0). \quad (7)$$

Thus, no information is lost when the Lambertian plane is in focus. Thus, $$Y(f_s) = L_A(f_s \cos\beta, f_s \sin\beta) \quad (8)$$

$$= 2a_0 L(f_s \cos\beta, 0)\text{sinc}(2a_0 f_s \sin\beta)$$

Thus, for out-of-focus setting ($S_{near}$ and $S_{far}$), the light field is attenuated by the frequency transform of the mask modulation function 420, which is the sine cardinal (sinc) function for an open aperture. This explains the attenuation of the high spatial frequencies in the acquired signal when the scene is out of focus.

Therefore, we modify the aperture so that the resulting aperture modulation function 420 has a broadband frequency response, ensuring that high spatial frequencies in the light field are preserved when the image is out of focus.

Incidentally, for a pinhole camera, the aperture function is a Dirac delta function, and the aperture modulation function is broadband in $f_\theta$. This explains why the images acquired by a pinhole camera are always in-focus. However, a pinhole camera, having an extremely small aperture, suffers from severe loss of light, reducing the signal to noise ratio (SNR) of the image.

One can use a carefully selected mask to perform the function of a broadband modulator of the light field in $f_\theta$, and realize greater degrees of freedom for Lambertian scenes, while increasing the amount of light captured when compared to a pinhole camera, as described below.

Band-Limited Light Fields

For general scenes, we assume that the light field is band-limited to $f_{x0}$ and $f_{\theta 0}$ as shown in FIG. 5

$$L(f_x, f_\theta)=0, \text{ for all } |f_x| \geq f_{x0}, |f_\theta| \geq f_{\theta 0}.$$

A conventional camera can only take a 1D (2D) slice of the 2D (4D) light field. To reconstruct the entire information content of the light field, we modulate the incoming light field so as to redistribute the energy from the 4D FLS space to the 2D sensor space.

FIG. 5 shows spectral slicing in the heterodyne light field camera 100. In the Fourier domain, the sensor measures the spectrum only along the horizontal axis ($f_\theta=0$). Without the mask, the sensor 120 cannot acquire the entire 2D light field spectrum. The mask spectrum forms an impulse train tilted by the angle α.

As shown in FIG. 6 according to our modulation theorem, the sensor light field and mask spectra convolve to form spectral replicas, placing light field spectral slices along a broad $f_\theta=0$ plane of the sensor.

As shown in FIG. 7 to reconstruct the light field spectrum, we translate segments of sensor spectra by demodulating the sensor slices, as shown by arrows, back to their original $f_x$ and $f_\theta$ locations to reconstruct the light field 101.

Heterodyne Light Field Camera

The required modulation can be achieved in the frequency domain by using an appropriately selected 2D mask arranged at an appropriate position between the lens and the sensor as shown in FIG. 8. The mask is only a 2D modulator. However, remarkably, in tandem with the lens 110, the desired 4D modulation can be achieved.

We believe that the camera according to the embodiments of the invention is the first design of a "single-snapshot" light field camera that does not use any additional lenses or other ray-bending optical devices.

Modulation Theorem and its Implications

The modulation theorem according to Oppenheim et al. states that when a baseband signal s(x) is multiplied by a cosine of frequency $f_0$, the results are replicas of the signal at that frequency:

$$F(\cos(2\pi f_0 x)s(x)) = \frac{1}{2}(F(f_x - f_0) + F(f_x + f_0)), \quad (9)$$

where $F(f_x)$ denotes the Fourier transform of s(x). This principle has been widely used in telecommunications and radio systems. There, the baseband signal is modulated using a carrier signal at a much higher frequency so that the baseband signal can be transmitted over long distances without significant loss of energy. The receiver demodulates the received signal to reconstruct the baseband signal. In essence, we wish to achieve is a similar result in the optical domain.

We would like to modulate the information in the angular variations of light field ($f_\theta$ frequencies) to higher frequencies in $f_x$ so that the high resolution sensor 120 can detect this information.

FIG. 5 shows a desired band limited light field 501 in the frequency domain. For simplicity, we assume the x plane to be the conjugate plane, so that the sensor image corresponds to a slice along $f_x$, i.e., a horizontal slice. Now consider a modulation function 502 whose frequency response is composed of impulses arranged on a slanted line 503 as shown in FIGS. 5-6.

If the light field is modulated by such a modulation function, then each of these impulses generates a spectral replica of the light field at its center frequency. Therefore, the result of this convolution are several spectral replicas of the desired light field along the slanted line, see FIG. 6.

The elegance of this specific modulation is that a horizontal slice 610 (dashed box) of the modulated light field spectrum now captures all the information in the original light field. Note that the angle α 503 is designed based upon the required frequency resolution in the θ and x dimensions, and the bandwidth of the incoming light field.

Heterodyne receivers in telecommunications demodulate the incoming signal to reconstruct the baseband signal. In our case as shown in FIG. 7, demodulation also redistribute the 1D signal to the 2D light field space. The process of demodulation rearranges the frequency response of the sensor, $Y(f_s)$, to reconstruct the bandlimited light field $L(f_x, f_\theta)$ 101 as shown in FIG. 7.

Mask Based Heterodyning

The modulation shown in FIGS. 5-6 can be achieved by placing a suitably selected attenuating mask in the optical path between the lens and sensor.

Masks as Light Field Modulators

As shown in FIG. 8, our mask is essentially a special 1D code c(y) (2D for 4D light field 410) placed in the optical path between the lens and sensor. Although the mask is 1D, its modulation function 420 is 2D, shown in FIGS. 9-10 for arrangements for our heterodyne light field camera. In ray-space, a cosine mask at d casts soft shadows on the sensor as shown in FIG. 8.

Figure 10:
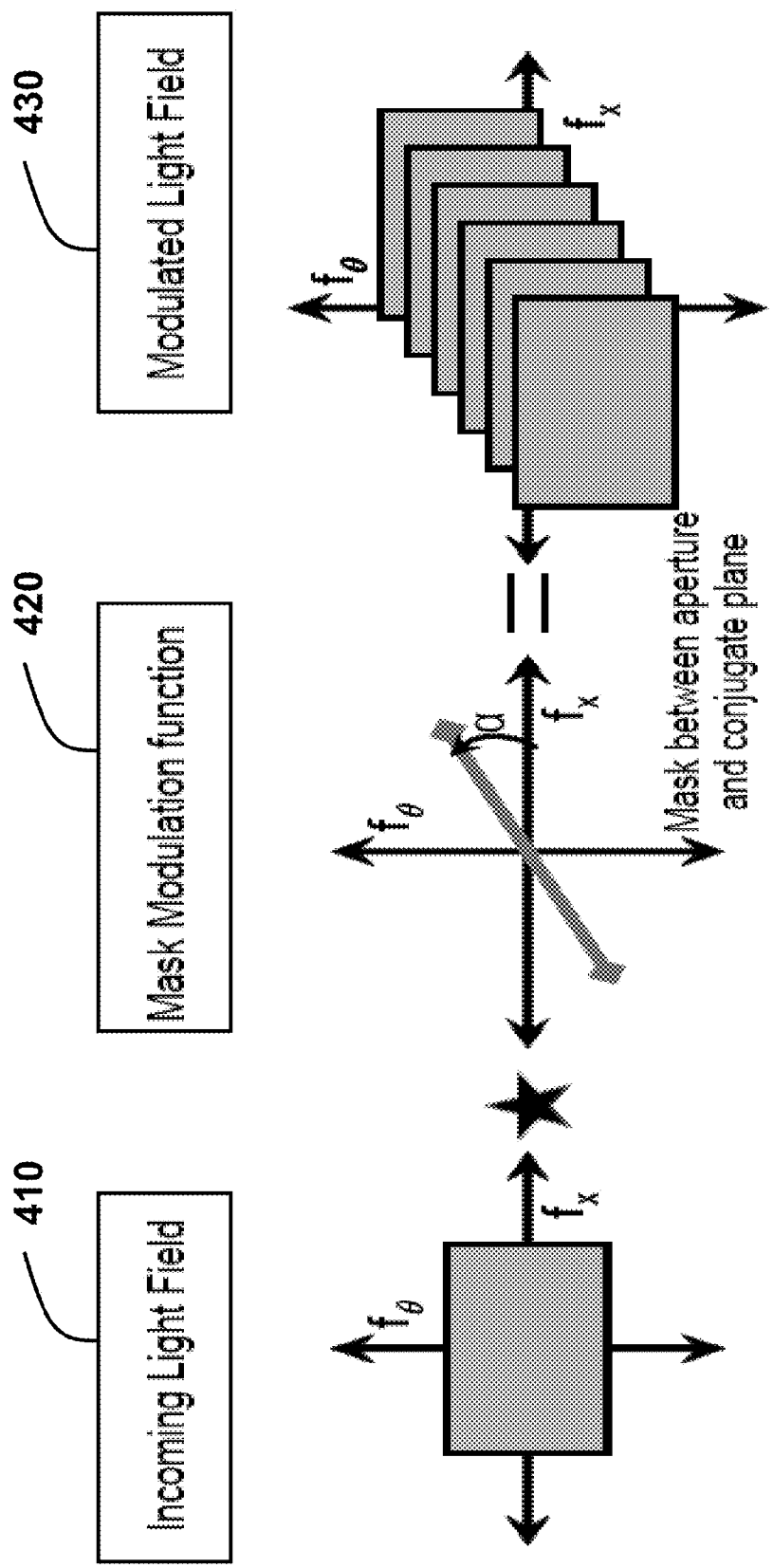
FIG. 10 is a schematic of spectral tiles in a Fourier domain according to an embodiment of the invention.

In Fourier domain as shown in FIG. 10, scene spectrum convolved with the mask spectrum made of impulses generates offset spectral tiles 910. Mask spectral impulses are horizontal at d=0, vertical at d=v, or tilted.

The mask affects the light field differently depending on where it is placed along the optical path in the camera. If the mask is placed at the aperture 115, i.e., the θ-plane, then the effect of mask is to multiply the aperture modulation function by the mask modulation function 410. The mask modulation function m(x, θ) is given by m(x, θ)=c(y=θ), i.e., the modulation function is independent of x. When placed at the θ-plane, the mask affects all rays at an angle θ in similar way, independent of the scene point from which the rays originate.

If the mask is placed at the conjugate plane, the mask equally attenuates all rays, independent of θ, for same x. This is because at the conjugate plane, all rays originating from a point on the plane of focus converge to a single point. Thus, the mask modulation function changes to m(x, θ)=c(y=x).

Figure 9:
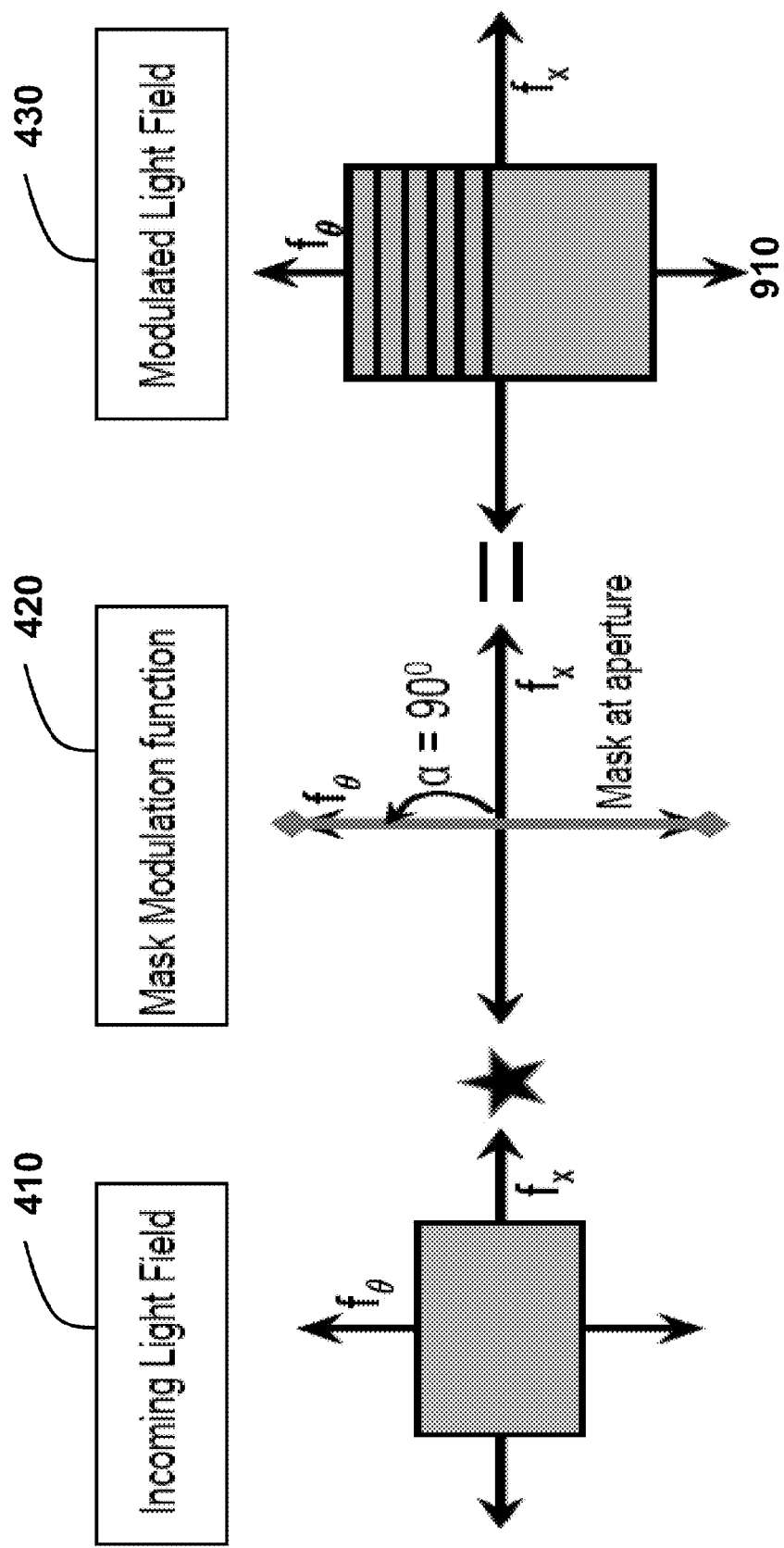
FIG. 9 is a schematic a cosine mask casting soft shadows on a sensor.

Thus, the modulation function corresponding to placing the same mask (code) at the aperture and the conjugate plane are related by a rotation of 90° in the 2D light field space. Moreover, as the 1-D code is moved from the aperture plane to the plane of the sensor, the resulting mask modulation function is rotated in 2D as shown in FIGS. 9-10. In the frequency domain, if the mask c(y) is placed at a distance d from the conjugate plane, then the mask modulation function is given by $$M(f_x, f_\theta) = c(f_x \csc(\alpha))\delta(f_\theta - f_x \tan \alpha), \quad (10)$$

where C denotes the Fourier transform of the 1D mask and v is the distance between the aperture and the conjugate plane, which depends upon the focal length of the lens 110.

The rotation angle α is given by $$\alpha = \frac{d}{v}\frac{\pi}{2}. \quad (11)$$

In other words, the mask modulation function has all its energy concentrated on a line in the 2D FLS space. The angle α of the line 503, with respect to the $f_x$ axis, depends upon the position of the mask. When the mask is placed at the conjugate plane (d=0), the angle α is equal to 0. As the mask moves away from the conjugate plane towards the aperture, this angle increases linearly to 90° at the aperture plane as shown in FIG. 10.

Optimal Mask Position for Heterodyining

In order to acquire the 2D light field, the modulation function $M(f_x, f_\theta)$ a series of impulses at an angle α given by $$\alpha = \arctan\frac{2f_{x0}}{f_{\theta R}}, \quad (12)$$

where $f_{x0}$ is the bandwidth of the light field in the $f_x$ axis, and $f_{\theta R}$ represents the desired frequency resolution on the $f_\theta$-axis as shown in FIG. 6.

For example, in FIG. 6, the frequency resolution has been depicted as being equal to $f\theta R=(\frac{2}{5})f_{\theta 0}$, where $f_{\theta 0}$ is the bandwidth of the light field in the $f_\theta$ axis. Thus, for acquiring the light-field of a given bandwidth, the physical position of the mask can be determined from equations (12) and (11).

In practice, because the spatial resolution is much larger than the angular resolution, the angle α is very small, and therefore the mask is to be placed close to the sensor for the heterodyne light field camera.

Optimal Mask Patterns

To achieve $M(f_x, f_\theta)$ as a set of 1D impulses of a slanted 2D line, the Fourier transform C(f) of the 1-D mask should be a set of impulses. Let 2p+1 be the number of impulses in $M(f_x, f_\theta)$. The Fourier transform of the 1D mask is then given by $$C(f) = \sum_{k=-p}^{k=p} \delta(f - kf_0), \quad (13)$$

where the fundamental frequency is $$f_0 = \sqrt{2f_{x0}^2 + f_{\theta R}^2}.$$

From FIG. 5, $(2p+1)f_{\theta R}=2f_{\theta 0}$. The bandwidth info is discretized by $f_{\theta R}$. Hence, the number of angular samples obtained in the light field is equal to $$\frac{2f_\theta}{f_{\theta R}} = 2p + 1.$$

Because the Fourier transform of the optimal mask is a set of symmetric Dirac delta functions (along with DC), this implies that the physical mask is a sum of set of cosines of a given fundamental frequency $f_0$, and its harmonics. The number of required harmonics is in fact p, which depends upon the bandwidth of the light field in the $f_\theta$ axis and the desired frequency resolution $f_{\theta R}$.

Reconstructing the 2D Light Field

To reconstruct the 2D light field from the 1D sensor image, we determine the Fourier transform of the sensor image, reshape the 1D Fourier transform into 2D as shown in FIG. 7, and determine the inverse Fourier transform. Thus, $$l(x,\theta)=IFT(\text{reshape}(FT(y(s)))), \quad (14)$$

where FT and IFT denote the Fourier and inverse Fourier transforms, and y(s) is the observed sensor image.

Note on 4-D Light Field Capture

Even though the analysis and the construction of mask-based heterodyning for light field acquisition was elucidated for 2D light fields, the procedure remains identical for acquiring 4D light fields with 2D sensors. The extension to the 4-D case is straightforward.

In case of a 4D light field, the information content in the 4D light field is heterodyned to the 2D sensor space by the use of a 2D mask placed between the lens and the sensor. The Fourier transform of the 2D mask contains a set of impulses on a 2D plane.

$$C(f_1, f_2) = \sum_{k_1=-p_1}^{k_1=p_1} \sum_{k_2=-p_2}^{k_2=p_2} \delta(f_1 - k_1 f_{01}, f_2 - k_2 f_{02}). \quad (15)$$

Because we cannot realize negative values in the mask as required, we boost the DC component of $C(f_1, f_2)$ so as to make the mask positive throughout.

FIG. 11A shows an enlarged high frequency 2D cosine mask, enlarged greatly. This 2D mask has four harmonics in both dimensions ($p_1=4$, $p_2=4$), with fundamental frequencies $f_{01}$ and $f_{02}$ being equal to 1 cycle/mm. This allows an angular resolution of 9×9 in the 4D light field.

To reconstruct the 4D light field as shown in FIG. 7, demodulation involves reshaping of the sensor Fourier transform in 4D. The number of angular samples in the light field is $t_1 = 2p_1+1$, and $t_2 = 2p_2+1$.

The 2D sensor image has N×N pixels. We first determine the 2D FFT of the sensor image. Then, we rearrange $t_1 \times t_2$ tiles of the 2D Fourier transform into 4D planes to obtain a $(N/t_1) \times (N/t_2) \times t_1 \times t_2$ 4D Fourier transform. The inverse FFT of this 4D Fourier transform gives the 4D light field.

Applications for Light Field Camera

Light Field Based Digital Refocusing

Refocused images can be obtained from the reconstructed Fourier transform of the light field by taking appropriate slices, see Ng, 2005 above incorporated herein by reference. By using the reconstructed light field 101, we are able to significantly enhance the depth of field in an image. Digital refocussing based on reconstructed light fields enables us to refocus even in the case of complicated scenes.

In addition, we can synthesize novel images and views from the reconstructed light field 101. For example, the novel image can be from a different point of view.

Generating High Resolution Image for Focused Part of the Scene

Our light field camera has an added advantage. We can generate a high resolution image of the Lambertian parts of the scene that is in focus. Consider a scene point that is in sharp focus. All rays from this scene point reach the same sensor pixel but are attenuated differently due to the mask. Therefore, the sensor pixel value is the product of the scene irradiance and the average value of the mask within the cone of rays reaching that pixel. This attenuation γ(x, y) varies from pixel to pixel, and can either be determined analytically, or reconstructed by acquiring a single calibration image of a uniform intensity Lambertian scene.

We can reconstruct the high resolution image I(x, y) of the scene points in focus as $$I(x,y) = s(x,y)/\gamma(x,y), \quad (16)$$

where s(x, y) is the acquired sensor image. Parts of the scene that were not in focus have a spatially varying blur in I(x, y). We use the image of a uniform intensity Lambertian light box as γ.

Encoded Blur Camera

Above, we describe a light field camera that uses an attenuating mask. In this section, we describe specific sub-class of light fields, e.g., light fields that results from layered Lambertian scenes. For such scenes, we show that using a low frequency mask at the aperture is a very powerful way of achieving full-resolution digital refocusing.

In conventional cameras, photographers can control the depth of field (DOF) only by controlling the size of the aperture (f-stop). As the aperture size decreases, the DOF of the camera increases proportionally, but the SNR decreases proportionally due to the loss of light.

Above we describe that an open aperture suppresses high spatial frequencies in the out-of-focus image. To preserve high spatial frequencies, we place a physical mask at the aperture whose frequency response is broadband. For a mask place at the aperture, $M(f_x, f_\theta)$ has all its energy concentrated along $f_\theta$ direction from equation (10). Thus, $M(f_x, f_\theta)=0$, for all $f_x$ not zero. The frequency transform of the mask modulated light field is $$L_M(f_x,f_\theta) = L(f_x,f_\theta) \otimes M(f_x,f_\theta). \quad (17)$$

Because for a Lambertian scene, $L(f_x, f_\theta)=0$, the above equation simplifies to $$L_M(f_x,f_\theta) = f_x,0)M(0,f_\theta)$$

Thus, the mask modulation function is multiplied by the frequency transform of the light field. In the primal domain, this is equivalent to a convolution of the mask and the sharp image of the scene. The scale of the mask is dependent on the degree of defocus blur. The sharp image can be reconstructed by deconvolution of the blurred image with the scaled mask. The same result can be reached from ray based analysis of the captured image.

Optimal Mask for Encoding Defocus Blur

Because the frequency transform of the light field is multiplied by the mask modulation function, the optimal mask has a broadband response in the frequency domain. Broadband masks, also popularly known as modified uniform redundant arrays (MURA) codes, have been used in coded aperture astronomy.

However, our lens based coded aperture is significantly different from conventional coded aperture used in astronomy, which does not use a lens. In conventional coded aperture, every scene element is circularly convolved with the mask.

In contrast in our lens based coding, the observed image is a linear convolution of the sharp image with the defocus point spread function (PSF). Because linear convolution is equivalent to circular convolution with zero padded kernel, the optimal mask for lens based coded aperture is different from MURA.

Moreover, coded aperture in astronomy can improve SNR only for point like galactic sources, such as stars, and gives no added benefits over pin-holes for area light sources. Hence, those techniques are not suitable for photography of natural worldly scenes.

A brute force linear search for searching the best binary code based on maximizing the minimum of the DFT magnitudes of the zero padded code for the problem of motion deblurring, is describe by Raskar et al., above.

Here, we show that a continuous valued code can give superior performance compared to a binary code, with the advantage of significantly reducing the search time. For finding a continuous code, we perform a continuous valued optimization based on maximizing the minimum of DFT magnitudes of zero padded code.

Figure 11C:
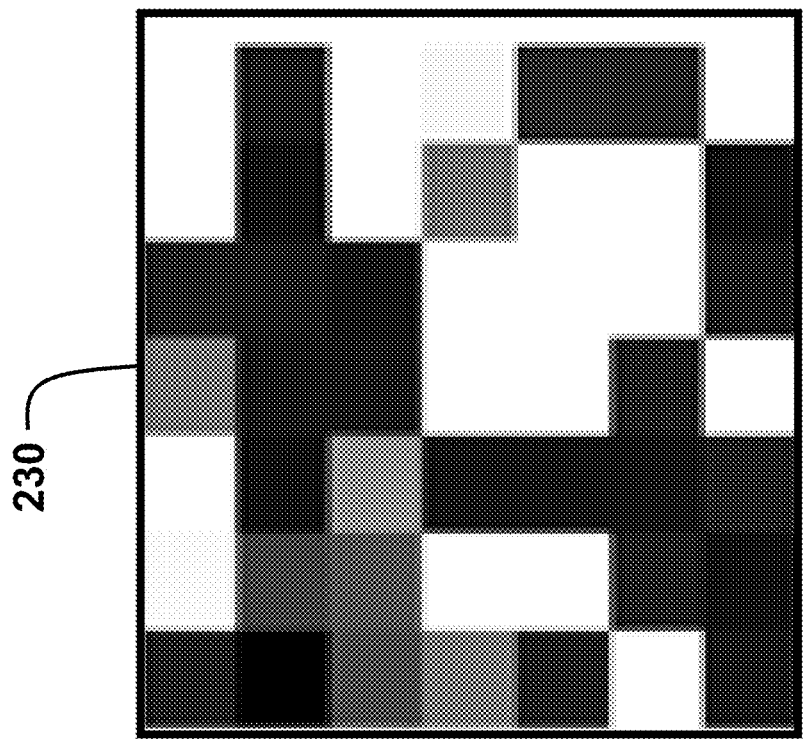
FIG. 11C is a diagram of a continuous broadband mask according to embodiments of the invention.
Figure 11B:
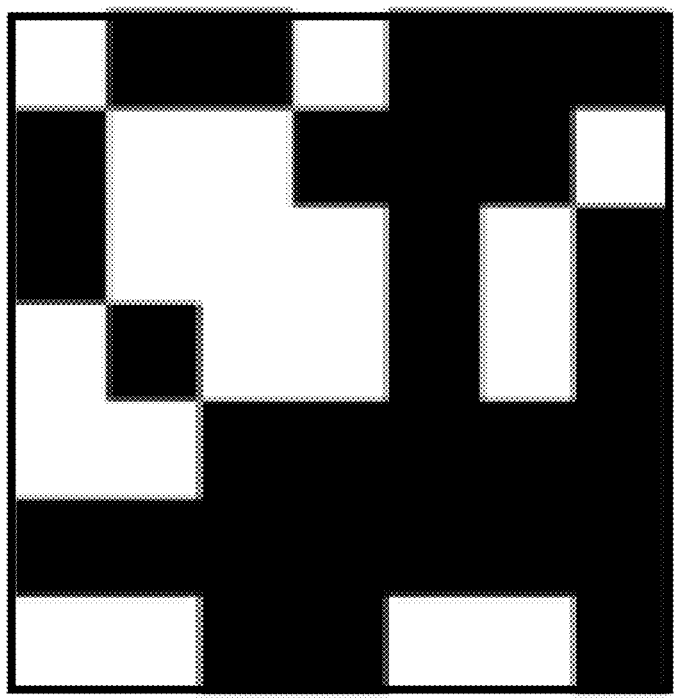
FIG. 11B is a diagram of prior art binary mask.

A sub-optimal binary code, such as the MURA code, can be provided as the initial guess. FIG. 11B shows conventional a 7×7 binary mask obtained after 10 hours of computational searching. FIG. 11C shows a continuous broadband mask obtained within few minutes of optimization. The minimum magnitude of DFT is equal to 0.013 (after zero-padding to 128) for the continuous code as opposed to 0.003 for the binary code. Using the noise analysis described below, the deconvolution noise for continuous valued code is smaller by 7.3 dB compared to the binary mask.

To capture the light field, we use masks that match the resolution of the sensor. This is ideal for the future trend of digital cameras where the pixels are becoming smaller to achieve higher resolution. It is possible to print RGB Bayer mosaics at pixel resolution, e.g., at 25, 50, and 100 nanometer resolution with 1024 gray levels. Such high resolution masks support heterodyning as well as Bayer mosaic operations in a single mask. Our masks are effectively 2D in a 4D space, but we can also use masks that are arranged at angles and locations, similar to a hologram, to achieve a complete 4D effect. Our broadband and cosine masks can also be in color and use polarizing effects to estimate scene properties.

Figure 12:
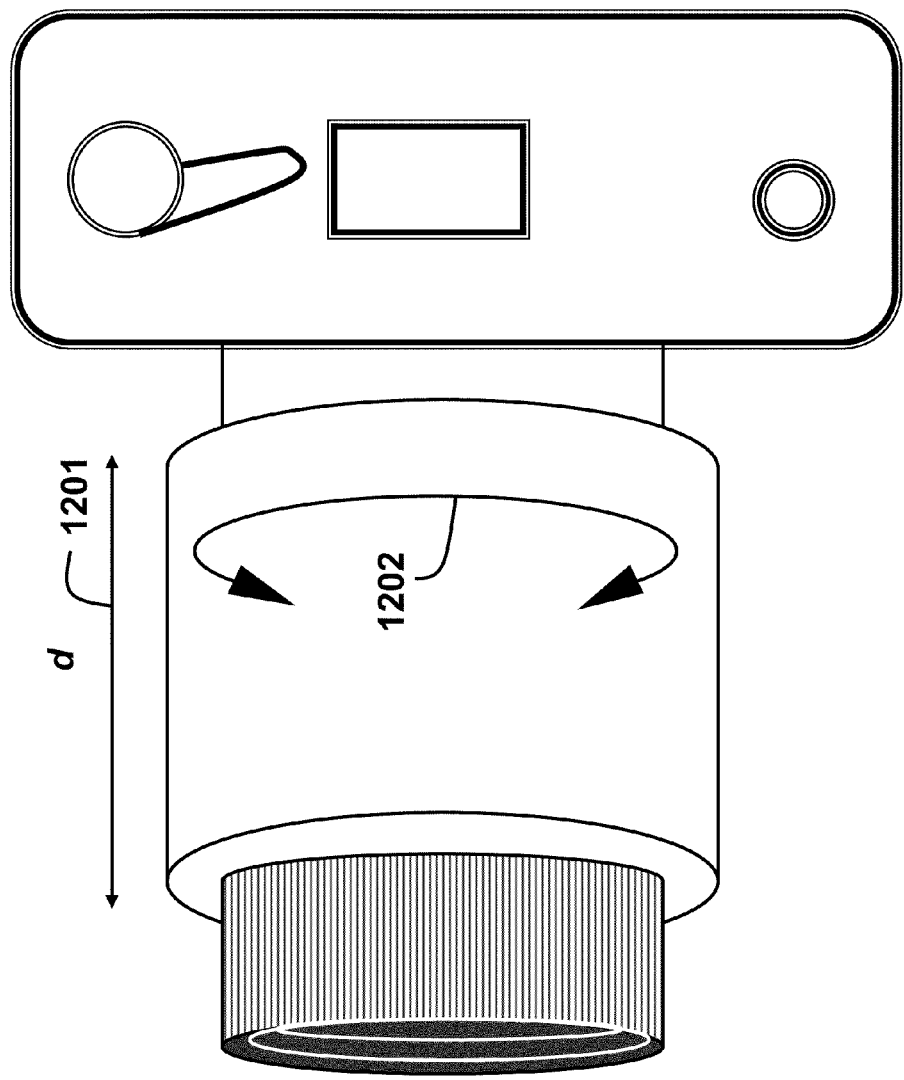
FIG. 12 is a top view of a camera with a mask controller.

Alternatively, the mask can be active so that position of the mask, and the patterns on the mask can be changed by the user or the camera depending on the application, or the scene. In this way, the spatial frequency of mask ranges continuously from low to high. The mask can be operated with a component, similar to a "zoom" lens control as shown in FIG. 12. Moving 1201 barrel controller in and out changes the position (d) of the mask over a continuous range, and rotating 1202 the controller changes the spatial frequency of the mask over a continuous range.

If the mask is high frequency near the sensor, then the result is a convolution of the Fourier transform of 2D (4D) light field with the Fourier transform of the mask. The Fourier transform of the mask is always 1D (2D), along a line (plane) in the 2D (4D) space. If the mask is near the lens, the line is along the θ-axis, and along the x-axis if near the sensor.

The reason that the mask is low frequency at the lens is because of diffraction. Diffraction increases with the distance of limiting aperture from the sensor. So when the mask is close to the sensor, diffraction is not an issue, and we can use a high frequency mask. The reason why a cosine mask is used near the sensor is because of the specific modulation that we wish to achieve.

Putting the mask at the lens has diffraction issues, so we prefer a low frequency mask. The reason we use a broadband and not a cosine mask at the lens is because we want to preserve high spatial frequencies in the out-of-focus image, so that we can deblur and refocus. Interestingly, if we put a cosine mask near the lens, then we can sense depth precisely.

Deconvolution Based Digital Refocusing

We achieve full resolution digital refocusing from a single encoded. out-of-focus image using image deconvolution techniques. Defocus blur in the acquired image is related to the depth of the scene. Although depth from defocus is known, determining a depth map from a single defocused image is challenging, unless a priori knowledge about the scene is assumed, or learning based approaches are used.

In contrast, we assume that the scene 102 is made up of n distinct layers, where n is a small number and the defocus point spread function (PSF) within each layer is spatially invariant. This assumption works well for a variety of scenes. We also assume that the maximum blur diameter in the image can be T pixels.

We achieve refocusing in two steps. First, we analyze the scene and estimate the number of layers and the scale of the PSF for each layer automatically. Then, we then generate n deblurred images, $I_1, \ldots, I_n$, by deconvolving the acquired blurred image by the estimated blur kernels.

To refocus at a layer i, we reblur the n−1 images ($I_1, \ldots, I_{i-1}, I_{i+1}, \ldots, I_n$) according to the difference of their blur from the blur of layer I, and then composite $I_i$ and the reblurred images to obtain the refocused image.

PSF Estimation

We assume that the entire image has a single layer with a defocus blur diameter of k pixels. The acquired image B is related to the sharp image I via convolution as $$B(x,y)=I(x,y)*h^k(x,y)+\eta, \quad (18)$$

where η denotes the measurement noise and $h_k$ is the PSF at scale k. Given the image I and $h_k$, the likelihood error can be written as $$e_l(x,y)=(B(x,y)-I(x,y)*h^k(x,y))^2. \quad (19)$$

However, this error itself is not sufficient to uniquely determine I and $h^k$ because $e_l(x, y)$ can be made equal to zero by assuming B equal to I.

To resolve this ambiguity, we use the statistics of natural images. It is known that real-world images obey heavy tail distributions in their gradients. In blurred images, high gradients are suppressed, thereby suppressing the tails of this distribution. We use the fourth-order moment (kurtosis) of gradients as a statistic for characterizing the gradient distribution.

At every pixel, the gradient error $e_g(x, y)$ is defined as the kurtosis of gradients within a small neighborhood R around that pixel, for example $$a.\ e_g(x,y)=-(\text{kurtosis}(\{I_x(x,y)\}_R)+\text{kurtosis}(\{I_y(x,y)\}R), \quad (20)$$

where $I_x$, $I_y$ denote the x and y gradients.

However, deblurring at a wrong scale higher than the correct scale k introduces high frequency deconvolution artifacts which may decrease $e_g$. Note that $e_l$ is small for low values of k and $e_g$ for the same pixel p is high for the blurred image. Thus, the two error measures compete with each other. To locate the correct scale, we use the combined error $e(x, y)=e_l(x, y)+\beta e_g(x, y)$, where β is a constant.

In the presence of multiple (n) layers, we deblur the image using blur kernels of different sizes, ranging from 1 to T pixels. For each of these T deblurred images, we determine the error map $e(x, y)$. For a layer with correct scale k, the $k^{th}$ error map has the smallest values for the region corresponding to that layer. This is equivalent to a discrete labeling problem for each pixel with T labels. The labeling cost at each pixel for a given label k is given by the $k^{th}$ error map $e^k(x, y)$.

We solve this labeling problem by adapting an alpha-expansion graph-cut procedure, see Boykov et al., "Fast approximate energy minimization using graph cuts," IEEE Trans. Pattern Anal. Machine Intell. 23, pp. 1222-1239, 2001, incorporated herein by reference. Because homogeneous regions in the image do not contain any blur information, we set the data cost for homogeneous regions to be zero, so that they get filled-in for each layer during graph cut optimization.

In contrast, we remove spurious layers having less than 10% of the total number of pixels in the image and perform simple morphological operations, e.g., hole filling, on the labels. This procedure yields a segmentation of the scene in terms of layers and the corresponding scales. The exact boundaries between the layers are not obtained, but the interiors of the layers are labeled properly.

Synthesizing Refocused Image

Because the scene has n layers, we only need to consider the n deblurred images ($I_1, \ldots, I_n$) at the corresponding scales. We use the labeling in the interior from the previous step to build color histograms for each layer (each channel is treated separately) from the corresponding deblurred image. We also build histogram for homogeneous regions external to all the layers using the given blurred image.

To refocus on a layer i, we reblur each of the n−1 images according to their scale difference from layer i. The refocused image is composed from $I_i$ and the n−1 reblurred images. Again, this can be treated as a labeling problem. We use a procedure described in by Agarwala et al. to generate a composite image, "Interactive digital photomontage," ACM Trans. Graph. 23, 3, pp. 294-302, 2004, incorporated herein by reference. The data cost at each pixel is selected as the "maximum likelihood" using the color histograms and the scene is based on matching colors and gradients.

Refocusing in Presence of Partial Occluders

Image completion and other hallucination techniques can be used to fill in missing or unwanted regions of the image. However, such techniques may not work on out-of-focus blurred images. Because the hallucinated pixel values are not modeled according to the defocus blur, deblurring on such images will produce artifacts.

Figure 13C:
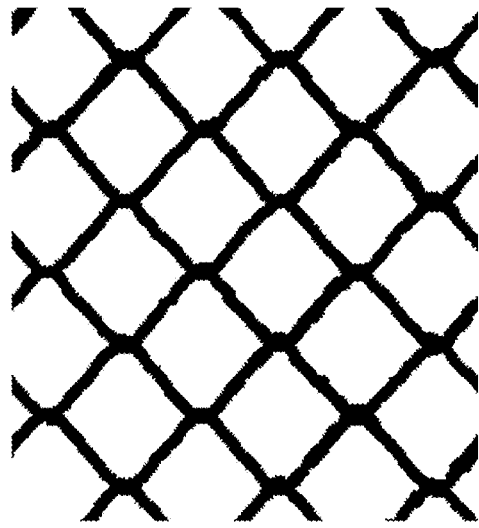
FIG. 13C is a mask of the fence in FIG. 13A.
Figure 13D:
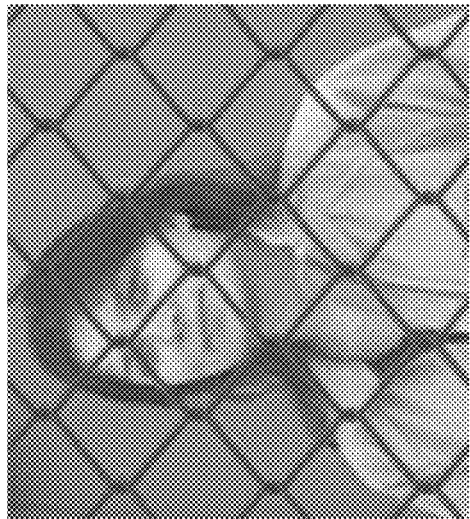
FIG. 13D is an output image according to an embodiment of the invention with both the fence and person in-focus.
Figure 13A:
FIG. 13A is an input image including an in-focus fence and an out-of-focus person.
Figure 13B:
FIG. 13B is a deblurred image corresponding to FIG. 13A.

FIG. 13A shows such a scene where a fence in front is in sharp focus and a person behind the fence is out of focus. Deblurring the image without taking the occluders into account will produce artifacts as shown in FIG. 13B. However, because blurring distributes the information to neighboring pixels, we can recover the sharp image if the blur size is larger than the occluder size.

As shown in FIG. 13C, we identify the pixels occluded by the fence using local variance analysis. Then, we perform a weighted deconvolution of the image by solving $$WAx=Wb, \qquad (21)$$

where W is a weighting matrix that sets the weights corresponding to the occluded pixels in the blurred image to zero, b is the vectorized blurred image and A is the block-Toeplitz matrix representing 2D blurring. After obtaining the in-focus image, we composite the in-focus image with the in-focus image of the fence, to bring both the person and fence in-focus as shown in FIG. 13D. Note that the matte for occluder can be over-estimated, as long as the blur is large enough.

Spatially Varying PSF

Figure 14A:
FIG. 14A is an input image of a tilted book, partly out of focus.
Figure 14B:
FIG. 14B is an output image according to an embodiment of the invention with the book entirely in-focus.

FIGS. 14A-14B show an example of spatially varying defocus blur due to a tilted book. To obtain an in-focus image, we fuse the deblurred images $I_1, \ldots, I_T$. We use four points on the blurred image to estimate the homography of the book, and estimate the PSF scale at each pixel using the scale at end points, and the homography parameters. The deblurred images are then combined according to the spatially varying scale to obtain the all in-focus image shown in FIG. 14B. Note that the word "ARCHITECTURE" cannot be read in the blurred image 14A but is sharp in the output image 14B.

Our broadband coding can be adapted to higher dimension, for example, by coding both in time [Raskar et al. 2006] and space. The benefit of masks compared to lenses is the lack of wavelength dependent focusing and chromatic aberrations. This fact is commonly used in astronomy. Hence, masks can be ideal for hyper-spectral imaging. Shallow depth of field is a serious barrier in medical and scientific microscopy. The facility to refocus, while maintaining full resolution, has a great benefit. In combination with confocal coded aperture illumination, we can capture digitally refocused images in a fewer incremental steps of the focal planes.

EFFECT OF THE INVENTION

The invention provides coded masks arranged in an optical path of an otherwise conventional camera to enable different type of computational improvement to the images acquired by the camera. We can place a fine, narrow-band mask near the front of the sensor. Then; we can computationally reconstruct the 4D light-field that enters the camera lens. The mask preserves our camera's ability to capture the focused part of the image at the full resolution of the sensor, in the same exposure used to capture the 4D light field.

Alternatively, we place a coarse, broadband mask at the lens aperture. Then, we can computationally refocus an out-of-focus image at full resolution. As this re-focussing relies on deconvolution, we can correct the focusing for images that require constant or piece-wise planar focusing. Other mask positions and spatial frequencies are also possible.

We describe methods for encoding and manipulating useful portions of a 4D light field. We identify a class of 4D cameras that re-map the Fourier transform of 4D ray space onto 2D sensors. Conventional 4D light field cameras use 2D lens arrays to project 4D ray-space itself rather than the Fourier transform of the rays. We achieve this frequency domain remapping using a single transmissive mask, and our method does not require additional optical elements such as lens arrays in conventional 4D light field cameras.

A heterodyne light field camera design is based on the modulation theorem in the 4D frequency domain. We acquire the light field using a 4D version of the method known as 'heterodyning' in radio. We generate spectral tiles of the light field in the 4D frequency domain by placing a high-frequency sinusoidal pattern between the lens and the sensor of the camera. To reconstruct the 4D light field, we take the Fourier transform of the 2D sensed signal, re-assemble the 2D tiles into a 4D stack of planes, and take the inverse Fourier transform.

In contrast with conventional 4D cameras that rely on lens arrays, our hybrid imaging/light field design does not force resolution tradeoffs for in-focus parts of the scene. The mask does not bend rays as they travel from scene to sensor, but only attenuates the rays in a fine, shadow-like pattern. If we compensate for this shadowing, we retain a full-resolution 2D image of the scene, as well as the lower-resolution 4D light field we reconstruct by Fourier-domain decoding.

An encoded blur camera design is based on the convolution theorem in the frequency domain. By placing a broadband mask in the aperture of the otherwise conventional 2D camera, we encode the defocus blur to preserve high spatial frequencies, which can be subsequently reconstructed by image deblurring. We show how to computationally refocus the full-resolution image at different depths for layered Lambertian scenes. This computed re-focussing is a special case of 4D remapping in the frequency domain that does not require measurement of the entire 4D light field, allowing us to avoid its huge resolution penalties. For both designs, we describe optimality criteria of the mask pattern and describe a method for computing highly efficient mask.

Our mask-based hybrid imaging/light-field cameras offer several advantages over previous methods. An attenuating mask is far simpler and less costly than multiple cameras or lens arrays, and avoids errors such as spherical, chromatic aberration, coma, and misalignment. Simpler mounts and flexible masks enable camera designs that offer user-selectable masks. Photographers can select any desired, tradeoff in angle vs. spatial resolution.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. An apparatus for sensing depth in a scene, comprising:
   a lens;
   a sensor; and
   a mask arranged in an aperture plane of the lens, wherein the mask includes an attenuation pattern to spatially modulate a 4D light field acquired of the scene, and wherein the pattern has a low spatial frequency to precisely sense depth in the scene acquired by the sensor, and wherein the mask is arranged on an optical path from the lens to the sensor;
   in which the sensor produces an input image, and further comprising:
   means for constructing the 4D light field from the input image.

2. The apparatus of claim 1, in which the sensor acquires a sequence of images of the scene.

3. The apparatus of claim 1, in which the mask uses polarizing effects.

4. The apparatus of claim 1, in which the mask heterodynes the 4D light field.

5. The apparatus of claim 1, wherein the mask preserves high spatial frequencies in an out-of-focus image.

6. The apparatus of claim 1, in which the sensor produces a defocused blur input image.

7. The apparatus of claim 1, in which the mask is placed at an angle with respect to the optical path.

8. The apparatus of claim 1, further comprising:
   means for synthesizing a novel refocused image from the reconstructed 4D light field.

9. The apparatus of claim 1, further comprising:
   means for generating a high resolution image from the reconstructed 4D light field.

10. The apparatus of claim 1, in which the pattern includes colors.

11. The apparatus of claim 1, further comprising:
    means for refocusing the input image from the reconstructed 4D light field at a different depth of field.

12. The apparatus of claim 1, further comprising:
    means for deblurring the input image to remove out of focus blur.

13. A method for acquiring a 4D light field of a scene, comprising the steps of:
    passing a 4D light field through a lens to a sensor along a straight optical path; and
    modulating the 4D light field with a mask, wherein the mask is arranged in an aperture plane of the lens, wherein the mask includes an attenuation pattern to spatially modulate a 4D light field acquired of the scene, and wherein the pattern has a low spatial frequency to precisely sense depth in the scene acquired by the sensor, and wherein the mask is arranged on an optical path from the lens to the sensor;
    in which the sensor produces an input image, and further comprising:
    means for reconstructing the 4D light field from the input image.

* * * * *